US007625959B2

(12) United States Patent
Daems et al.

(10) Patent No.: US 7,625,959 B2
(45) Date of Patent: Dec. 1, 2009

(54) CURABLE JETTABLE LIQUID FOR FLEXOGRAPHY

(75) Inventors: Eddie Daems, Herentals (BE); Luc Leenders, Herentals (BE)

(73) Assignee: Agfa Graphics, N.V., Mortsel (BE)

( * ) Notice: Subject to any disclaimer, the term of this patent is extended or adjusted under 35 U.S.C. 154(b) by 611 days.

(21) Appl. No.: 11/211,323

(22) Filed: Aug. 25, 2005

(65) Prior Publication Data

US 2006/0054040 A1 Mar. 16, 2006

Related U.S. Application Data

(60) Provisional application No. 60/613,163, filed on Sep. 24, 2004.

(30) Foreign Application Priority Data

Sep. 16, 2004 (EP) ................................ 04104487

(51) Int. Cl.
*C09D 11/00* (2006.01)

(52) U.S. Cl. ...................................... 523/160; 523/161

(58) Field of Classification Search ................. 523/160, 523/161
See application file for complete search history.

(56) References Cited

U.S. PATENT DOCUMENTS

| | | | | |
|---|---|---|---|---|
| 3,951,657 | A | 4/1976 | Recchia et al. | |
| 3,960,572 | A | 6/1976 | Ibata et al. | |
| 4,323,637 | A | 4/1982 | Chen et al. | |
| 4,427,759 | A | 1/1984 | Gruetzmaacher et al. | |
| 5,275,646 | A | 1/1994 | Marshall et al. | |
| 5,301,610 | A | 4/1994 | McConnell | |
| 5,511,477 | A | 4/1996 | Adler et al. | |
| 5,538,548 | A | 7/1996 | Yamazaki | |
| 5,889,084 | A * | 3/1999 | Roth | 523/161 |
| 6,358,668 | B1 | 3/2002 | Leenders et al. | |
| 6,520,084 | B1 | 2/2003 | Gelbart | |
| 6,521,390 | B1 | 2/2003 | Leinenbach et al. | |
| 2002/0086914 | A1 * | 7/2002 | Lee et al. | 522/75 |
| 2002/0128340 | A1 | 9/2002 | Young et al. | |
| 2004/0046668 | A1 | 3/2004 | Smith et al. | |
| 2004/0129158 | A1 | 7/2004 | Figov et al. | |
| 2004/0132862 | A1 * | 7/2004 | Woudenberg | 523/160 |
| 2004/0161704 | A1 | 8/2004 | Huang | |
| 2004/0198868 | A1 * | 10/2004 | Tielemans et al. | 523/161 |

FOREIGN PATENT DOCUMENTS

| | | | |
|---|---|---|---|
| DE | 103 60 997 | A1 | 8/2004 |
| EP | 0 540 203 | A1 | 5/1993 |
| EP | 1 158 364 | A2 | 11/2001 |
| EP | 1 428 666 | A1 | 6/2004 |
| EP | 1 449 648 | A2 | 8/2004 |

OTHER PUBLICATIONS

European Search Report in 04 10 4487 (Feb. 7, 2005).

* cited by examiner

*Primary Examiner*—Edward J Cain
(74) *Attorney, Agent, or Firm*—Leydig, Voit & Mayer, Ltd.

(57) ABSTRACT

A curable jettable liquid for manufacturing a flexographic printing plate comprising at least one photo-initiator, at least one monofunctional monomer, at least 5 wt % of a polyfunctional monomer or oligomer and at least 5 wt % of a plasticizer both based on the total weight of the curable jettable liquid capable of realizing a layer after curing having an elongation at break of at least 5%, a storage modulus E' smaller than 200 MPa at 30 Hz and a volumetric shrinkage smaller than 10%.

20 Claims, No Drawings

CURABLE JETTABLE LIQUID FOR FLEXOGRAPHY

CROSS-REFERENCE TO RELATED PATENT APPLICATIONS

This application claims the benefit of U.S. Provisional Application No. 60/613,163 filed Sep. 24, 2004, which is incorporated by reference. In addition, this application claims the benefit of European Application No. 04104487 filed Sep. 16, 2004, which is also incorporated by reference.

TECHNICAL FIELD

This invention relates to digital flexography, and more specifically to a curable jettable liquid for manufacturing a flexographic printing plate.

BACKGROUND ART

Flexographic printing plates are well known for use in printing on surfaces which are soft and easily deformable, such as packaging materials, e.g. cardboard and plastic films. They can be prepared from a printing plate precursor having a layer consisting of a photo-polymerizable composition, which generally comprises an elastomeric binder, at least one monomer and a photo-initiator. Early patents on flexographic printing plates include U.S. Pat. No. 3,960,572 (ASAHI CHEMICAL), U.S. Pat. No. 3,951,657 (UPJOHN), U.S. Pat. No. 4,323,637 (DU PONT) and U.S. Pat. No. 4,427,759 (DU PONT).

Traditionally, an image is applied to the printing plate precursor by flood exposing the photo-polymerizable layer to actinic radiation (e.g. ultraviolet radiation) with an image mask interposed between the radiation source and the printing plate precursor. The actinic radiation causes polymerization to occur in the areas of the photo-polymerizable layer not shielded by the image mask. After imaging, the plates are processed with a suitable solvent to remove the photo-polymerizable composition in the unexposed areas, thereby creating a relief-based image on the printing plate. The processed plates are then mounted on a printing press, where they are used to transfer ink to a desired printing surface.

The process for manufacturing a flexographic printing plate was simplified by applying a layer for forming the image mask directly on the printing plate precursor. In U.S. Pat. No. 6,521,390 (AGFA), an IR-ablatable layer, substantially opaque to actinic radiation, was laminated on the flexographic printing plate precursor. U.S. Pat. No. 6,358,668 (AGFA) discloses an ink-receiving layer on the photo-polymerizable layer of a flexographic printing plate precursor, wherein the jetted ink on the ink-receiving layer creates an image mask of high optical density. Although the process for preparing the flexographic printing plate was simplified by incorporating an image mask forming layer into the printing plate precursor, the process remains complicated and time-consuming. Furthermore, the process is not environment-friendly due to a high waste production in removing the unexposed areas of the photo-polymerizable layer.

U.S. Pat. No. 5,511,477 (IDANIT TECHNOLOGIES) discloses a method for the production of photopolymeric relief-type printing plates comprising the steps of forming a positive or negative image on a substrate by ink jet printing with a photopolymeric ink composition, optionally preheated to a temperature of about 30 to 260° C.; and of subjecting the resulting printed substrate to UV radiation, thereby curing the ink composition forming the image. Suitable substrates for this method are restricted to steel, polyester and other rigid materials, limiting the possibilities for flexographic applications. Another problem is that jetted droplets of the polymeric ink are still mobile and tend to deform, thereby preventing accurate reproduction of small dots and preventing the formation of sharp edges and hence the formation of a sharp image.

U.S. Pat. No. 6,520,084 (CREO) discloses a method for manufacturing a flexographic printing plate by means of multiple passes of an ink-jet unit employing two different elastomers that are deposited on a modifying surface. For jetting, the elastomers can be liquefied by heating meltable polymers to temperatures between 100 and 150° C. or by dissolving them in hazardous and toxic solvents such as toluene. The requirement of high temperatures restricts not only the choice of suitable substrates, but also limits the ink-jet printer to a "solid ink-jet" device. The toluene is allowed to evaporate between every two deposited layers, creating a hostile environment.

EP 1428666 A (AGFA) discloses a method for preparing a flexographic printing plate by jetting radiation curable ink-jet ink on a resilient substrate. The disclosed inks do not contain any elastomers and the quality of the flexographic printing plate is inferior to conventional flexographic printing plates. Experiments by the present inventors to prepare a curable jettable liquid containing elastomers in a sufficient amount to improve the quality of such flexographic printing plates were not successful.

There is therefore a need to provide an improved curable jettable liquid for manufacturing a flexographic printing plate with a high image quality and applicable to a wide range of applications, including printing on soft and easily deformable surfaces. Furthermore, a large choice of suitable, cheap ink-jet printers is desirable, i.e. printers using print heads of a continuous type or print heads of a piezoelectric, a thermal, an electrostatic and an acoustic drop on demand type.

OBJECTS OF THE INVENTION

It is an object of the present invention to provide a curable jettable liquid suitable for manufacturing a flexographic printing plate in a fast, simple and environmental friendly manner.

It is another object of the present invention to provide a curable jettable liquid suitable for manufacturing a flexographic printing plate exhibiting high image quality.

It is another object of the present invention to provide a curable jettable liquid suitable for manufacturing a flexographic printing plate with a cheap ink-jet printer using a piezoelectric print head at a low temperature.

These and other objects of the invention will become apparent from the description hereinafter.

SUMMARY OF THE INVENTION

It has been surprisingly found that a flexographic printing plate can be obtained by an ink-jet process exhibiting a quality comparable to that of a conventional flexographic printing plate.

The objects of the present invention are realized with a curable jettable liquid for manufacturing a flexographic printing plate comprising at least one photo-initiator, at least one monofunctional monomer, at least 5 wt % of a polyfunctional monomer or oligomer and at least 5 wt % of a plasticizer both based on the total weight of the curable jettable liquid capable of realizing a layer after curing having an elongation at break of at least 5%, a storage modulus E' smaller than 200 mPa at 30 Hz and a volumetric shrinkage smaller than 10

Further advantages and embodiments of the present invention will become apparent from the following description.

DETAILED DESCRIPTION OF THE INVENTION

Definitions

The term "curable jettable liquid" as used in disclosing the present invention, means the jettable fluid for manufacturing the flexographic printing plate.

The term "printing ink" as used in disclosing the present invention, means the fluid for producing an image with a flexographic printing plate.

The term "elastomer" as used in disclosing the present invention, means a polymeric material, which at room temperature can be stretched under low stress to great extents and is capable of recovering its approximate original shape upon removal of that stress, e.g. a synthetic rubber or plastic.

The term "plasticizer" as used in disclosing the present invention, means a substance added to plastics or other materials to make them more flexible.

The term "elongation at break", as used in disclosing the present invention, means the elongation in % of a 0.4 mm thick layer at the time of its rupture.

The term "complex modulus (E*)" as used in disclosing the present invention, describes the visco-elastic behaviour of a material and is represented by the formula $E^*=E'+iE''$, wherein the real part is the elastic (or storage) modulus E' and the imaginary part is the loss modulus E".

The term "storage modulus (E')" as used in disclosing the present invention, is the elastic component of the complex modulus E* of a material and is related to the stiffness of the material.

The term "loss modulus (E")" as used in disclosing the present invention, is the viscous component of the complex modulus E* of a material and is related to the ability of the material to dissipate mechanical energy through molecular motion.

The term "UV" is used in disclosing the present application as an abbreviation for ultraviolet radiation.

The term "ultraviolet radiation" as used in disclosing the present invention, means electromagnetic radiation in the wavelength range of 4 to 400 nm.

The term "actinic radiation" as used in disclosing the present invention, means electromagnetic radiation capable of initiating photochemical reactions.

The term "monofunctional" as used in disclosing the present invention, means one reactive functional group.

The term "polyfunctional" as used in disclosing the present invention, means more than one reactive functional group.

The term "acid functionalized" as used in disclosing the present invention means comprising at least one acid functional group.

The term "oligomer" as used in disclosing the present invention, means a polymer made up of two, three or four monomer units.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "acyl group" as used in disclosing the present invention means —(C═O)-aryl and —(C═O)-alkyl groups.

The term "saturated aliphatic group" as used in disclosing the present invention means saturated straight chain, branched chain and alicyclic hydrocarbon groups.

The term "unsaturated aliphatic group" as used in disclosing the present invention means straight chain, branched chain and alicyclic hydrocarbon groups which contain at least one double or triple bond.

The term "aromatic group" as used in disclosing the present invention means a covalently bonded assemblage of cyclic conjugated carbon atoms, which are characterized by large resonance energies, e.g. benzene, naphthalene and anthracene.

The term "alicyclic hydrocarbon group" means a covalently bonded assemblage of cyclic conjugated carbon atoms, which do not form an aromatic group, e.g. cyclohexane.

The term "substituted" as used in disclosing this invention means that one or more of the carbon atoms and/or that a hydrogen atom of one or more of the carbon atoms in an aliphatic group, an aromatic group or an alicyclic hydrocarbon group, are replaced by an oxygen atom, a nitrogen atom, a phosphorous atom, a silicon atom, a sulfur atom, a selenium atom or a tellurium atom, or a group containing one or more of these said carbon and hydrogen replacing atoms. Such substituents include hydroxyl groups, thiol groups, carbamate groups, urea groups, ether groups, thioether groups, carboxylic acid groups, ester groups, sulphonate groups, sulphonamide groups, phosphonate groups, phosphonamide groups, phosphonamidate groups, amide groups and amine groups.

The term "heteroaromatic group" means an aromatic group wherein at least one of the cyclic conjugated carbon atoms is replaced by a nitrogen atom or a phosphorous atom.

The term "heterocyclic group" means an alicyclic hydrocarbon group wherein at least one of the cyclic conjugated carbon atoms is replaced by an oxygen atom, a nitrogen atom, a phosphorous atom, a silicon atom, a sulfur atom, a selenium atom or a tellurium atom.

Curable Jettable Liquid

The curable jettable liquid according to the present invention for manufacturing a flexographic printing plate contains at least four components: (i) a monofunctional monomer, (ii) a polyfunctional monomer or oligomer, (iii) a plasticizer and (iv) a photo-initiator.

The curable jettable liquid according to the present invention for manufacturing a flexographic printing plate may contain a polymerization inhibitor to restrain polymerization by heat or actinic radiation. It is preferred to add an inhibitor during preparation of the curable jettable liquid.

The curable jettable liquid according to the present invention for manufacturing a flexographic printing plate may further contain at least one acid functionalized monomer or oligomer.

The curable jettable liquid according to the present invention for manufacturing a flexographic printing plate may further contain at least one elastomer.

The curable jettable liquid according to the present invention for manufacturing a flexographic printing plate may further contain at least one surfactant for controlling the spreading of a curable jettable liquid droplet.

The curable jettable liquid according to the present invention for manufacturing a flexographic printing plate may further contain at least one colorant for increasing contrast between the jetted image and the background.

The curable jettable liquid according to the present invention for manufacturing a flexographic printing plate may further contain water and/or organic liquids, such as alcohols, fluorinated solvents and dipolar aprotic liquids.

The curable jettable liquid according to the present invention for manufacturing a flexographic printing plate may further contain at least one humectant.

A biocide may be added to the curable jettable liquid according to the present invention for manufacturing a flexographic printing plate to prevent unwanted microbial growth, which may occur in the curable jettable liquid over time. The biocide may be used either singly or in combination.

The curable jettable liquid according to the present invention for manufacturing a flexographic printing plate may further contain additives such as buffering agents, anti-mold agents, pH adjustment agents, electric conductivity adjustment agents, chelating agents, anti-rusting agents and light stabilizers. Such additives may be incorporated in the curable jettable liquids of the present invention in any effective amount, as desired. Examples of pH controlling agents suitable for curable jettable liquids of the present invention include, but are not limited to, acids, and bases, including hydroxides of alkali metals such as lithium hydroxide, sodium hydroxide and potassium hydroxide. The amount included will depend upon the specific component being included.

The curable jettable liquid according to the present invention for manufacturing a flexographic printing plate preferably has a viscosity at a shear rate of $100\ s^{-1}$ and at a temperature between 15 and 70° C. of not more than 100 mPa·s, preferably less than 50 mPa·s, and more preferably less than 15 mPa·s.

Monofunctional Monomers

Any polymerizable monofunctional monomer commonly known in the art may be employed.

Suitable monofunctional monomers include styrene, methylstyrene, chlorostyrene, bromostyrene, methoxystyrene, dimethylaminostyrene, cyanostyrene, nitrostyrene, hydroxystyrene, aminostyrene, carboxystyrene, acrylic acid, methyl acrylate, ethyl acrylate, cyclohexyl acrylate, acrylamide, methacrylic acid, methyl methacrylate, ethyl methacrylate, propyl methacrylate, butyl methacrylate, phenyl methacrylate, cyclohexyl methacrylate, isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloxyethylphthalic acid, 2-acryloxyethyl-2-hydroxyethylphthalic acid, lactone modified flexible acrylate, t-butylcyclohexyl acrylate, vinyl pyridine, N-vinylpyrrolidone, N-vinylimidazole, 2-vinylimidazole, N-methyl-2-vinylimidazole, propyl vinyl ether, butyl vinyl ether, isobutyl vinyl ether, beta-chloroethyl vinyl ether, phenyl vinyl ether, p-methylphenyl vinyl ether, and p-chlorophenyl vinyl ether.

The monofunctional monomer is preferably an acrylate monomer.

Two or more monofunctional monomers can be used in combination.

The monofunctional monomer preferably has a viscosity smaller than 30 mPa·s at a shear rate of $100\ s^{-1}$ and at a temperature between 15 and 70° C.

Polyfunctional Monomers and Oligomers

Any polymerizable polyfunctional monomer and oligomer commonly known in the art may be employed.

Suitable polyfunctional monomers are monomers such as divinylbenzene, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, alkoxylated dimethyloltricyclodecane diacrylate, polytetramethylene glycol diacrylate, distyryl oxalate, distyryl malonate, distyryl succinate, distyryl glutarate, distyryl adipate, distyryl maleate, distyryl fumarate, distyryl beta,beta'-dimethylglutarate, distyryl 2-bromoglutarate, distyryl alpha,alpha'-dichloroglutarate, distyryl terephthalate, oxalic acid di(ethyl acrylate), oxalic acid di(methyl ethyl acrylate), malonic acid di(ethyl acrylate), malonic acid di(methyl ethyl acrylate), succinic acid di(ethyl acrylate), glutaric acid di(ethyl acrylate), adipic acid di(ethyl acrylate), maleic acid di(diethyl acrylate), fumaric acid di(ethyl acrylate), beta,beta'-dimethylglutaric acid di(ethyl acrylate), ethylenediacrylamide, propylenediacrylamide, 1,4-phenylenediacrylamide, 1,4-phenylenebis (oxyethyl acrylate), 1,4-phenylenebis(oxymethyl ethyl acrylate), 1,4-bis(acryloyloxyethoxy)cyclohexane, 1,4-bis (acryloyloxymethylethoxy)cyclohexane, 1,4-bis (acryloyloxyethoxycarbamoyl)benzene, 1,4-bis (acryloyloxymethylethoxycarbamoyl)benzene, 1,4-bis (acryloyloxyethoxycarbamoyl)cyclohexane, bis(acryloyloxyethoxycarbamoylcyclohexyl)methane, oxalic acid di(ethyl methacrylate), oxalic acid di(methyl ethyl methacrylate), malonic acid di(ethyl methacrylate), malonic acid di(methyl ethyl methacrylate), succinic acid di(ethyl methacrylate), succinic acid di(methyl ethyl methacrylate), glutaric acid di(ethyl methacrylate), adipic acid di(ethyl methacrylate), maleic acid di(ethyl methacrylate), fumaric acid di(ethyl methacrylate), fumaric acid di(methyl ethyl methacrylate), beta,beta'-dimethylglutaric acid di(ethyl methacrylate), 1,4-phenylenebis(oxyethyl methacrylate), 1,4-bis (methacryloyloxyethoxy)cyclohexane, acryloyloxyethoxyethyl vinyl ether, pentaerythritol triacrylate, pentaerythritol trimethacrylate, pentaerythritol tri(hydroxystyrene), cyanuric acid triacrylate, cyanuric acid trimethacrylate, 1,1,1-trimethylolpropane triacrylate, 1,1,1-trimethylolpropane trimethacrylate, EO modified trimethylolpropane triacrylate, tri(propylene glycol)triacrylate, caprolactone modified trimethylolpropane triacrylate, pentaerythritol tetraacrylate, pentaerythritolethoxy tetraacrylate, dipentaerythritol hexaacrylate, ditrimethylolpropane tetraacrylate, glycerinpropoxy triacrylate, cyanuric acid tri (ethyl acrylate), 1,1,1-trimethylolpropane tri(ethylacrylate), dipentaerythritol hexaacrylate, cyanuric acid tri(ethyl vinyl ether), a condensate of a reaction product between 1,1,1-trimethylolpropane and three-fold moles of toluenediisocyanate, with hydroxyethyl acrylate, and a condensate of a reaction product pattern 1,1,1-trimethylolpropane and three-fold moles of hexanediisocyanate, with p-hydroxystyrene, ethylenetetraacrylamide, and propylenetetraacrylamide.

The polyfunctional monomer is preferably an acrylate monomer.

Suitable polymerizable oligomers are oligomers polymerized from the monofunctional and/or polyfunctional monomers disclosed above. Particularly preferred oligomers include epoxy acrylates, aliphatic urethane acrylates, aromatic urethane acrylates, polyester acrylates, polyether acrylates, amine modified polyether acrylates and straight-chained acrylic oligomers.

The polyfunctional monomer or oligomer is preferably a straight-chained monomer or oligomer.

Two or more polyfunctional monomers and/or oligomers can be used in combination.

The polyfunctional monomer or oligomer preferably has a viscosity larger than 50 mPa·s at a shear rate of 100 $s^{-1}$ and at a temperature between 15 and 70° C.

Acid Functionalized Monomers and Oligomers

Any polymerizable acid functionalized monomer and oligomer commonly known in the art may be employed. The acid functionalized monomers and oligomers may contain a plurality of acid functional groups.

The acid functional group is preferably selected from the group consisting of a carboxylic acid functional group and a phosphoric acid functional group.

A preferred acid functionalized monomer is selected from the group consisting of an acid functionalized acrylate monomer, an acid functionalized (metha)acrylate monomer, an acid functionalized acrylate oligomer and an acid functionalized (metha)acrylate oligomer. Particularly preferred are Ebecryl® 168, Ebecryl® 170 and Ebecryl® 770 available from UCB.

A preferred acid functionalized monomer is selected from the group consisting of 2-(methacryloyl)ethyl phthalate, 2-(acryloyl)ethyl phthalate, 2-(methacrylyoloxy)ethyl succinate, 2-(acryloxy)ethyl succinate, ethylene glycol methacrylate phosphate and 2-carboxyethyl acrylate.

A preferred acid functionalized oligomer is selected from the group consisting of multifunctional acid oligomeric methacrylates and multifunctional acid oligomeric acrylates. Particularly preferred are Sartomer® SB510E35, Sartomer® SB520E35 and Sartomer® SB500E50 available from CRAY VALLEY.

Photo-Initiators

A catalyst called a photo-initiator typically initiates the polymerization reaction. The photo-initiator requires less energy to activate than the monomers and oligomers to form the polymer.

The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A preferred amount of initiator is 1 to 10 weight % of the total curable jettable liquid weight, and more preferably 1 to 7 weight % of the total curable jettable liquid weight.

A combination of two or more photo-initiators may be used.

A photo-initiator system can also be used. A suitable photo-initiator system is a photoinitiator, which is activated by actinic radiation and forms free radicals by hydrogen abstraction or electron extraction from a second compound. The second compound, usually called the co-initiator, becomes the actual initiating free radical.

Irradiation with actinic radiation may be realized in two steps by changing wavelength or intensity. In such cases it is preferred to use 2 types of initiator together.

Suitable photo-initiators for use in the curable jettable liquid according to the present invention include: quinones, benzophenone and substituted benzophenones, hydroxyl alkyl phenyl acetophenones, dialkoxy acetophenones, α-halogeno-acetophenones, aryl ketones (such as 1-hydroxycyclohexyl phenyl ketone), 2-hydroxy-2-methyl-1-phenylpropan-1-one, 2-benzyl-2-dimethylamino-(4-morpholinophenyl)butan-1-one, thioxanthones (such as isopropylthioxanthone), benzil dimethylketal, bis (2,6-dimethylbenzoyl)-2,4,4-trimethylpentylphosphine oxide, trimethylbenzoyl phosphine oxide derivatives such as 2,4,6trimethylbenzoyldiphenylphosphine oxide, methyl thio phenyl morpholino ketones such as 2-methyl-1-[4-(methylthio)phenyl]-2-morpholinopropan-1-one, morpholino phenyl amino ketones, 2,2-dimethoxy-1,2-diphenylethan-1-one or 5,7-diiodo-3-butoxy-6-fluorone, diphenyliodonium fluoride and triphenylsulfonium hexaflurophosphate. benzoin ethers, peroxides, biimidazoles, benzyl dimethyl ketal, aminoketones, benzoyl cyclohexanol, oxysulfonyl ketones, sulfonyl ketones, benzoyl oxime esters, camphorquinones, ketocoumarins, and Michler's ketone.

These photo-initiators are readily commercially available, albeit sometimes in a mixture with one or more other photo-initiators: Irgacure® 184, Irgacure® 500, Irgacure® 907, Irgacure® 369, Irgacure® 651, Irgacure® 819, Irgacure® 1000, Irgacure® 1300, Irgacure® 1700, Irgacure® 1800, Irgacure® 1870, Darocur® 1173, Darocur® 4265 and Darocur® ITX available from CIBA SPECIALTY CHEMICALS, Lucerin TPO available from BASF AG, Esacure® KK, Esacure® KT046, Esacure® KT055, Esacure® KIP150, Esacure® KT37 and Esacure® EDB available from LAMBERTI, H-Nu® 470 and H-Nu® 470X available from SPECTRA GROUP Ltd., Genocure® EHA and Genocure® EPD available from RAHN.

Particularly preferred photo-initiators are Irgacure® 819, Irgacure® 1300 and Irgacure® 1800 available from CIBA SPECIALTY CHEMICALS.

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, methylhydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer® GA-80, Sumilizer® GM and Sumilizer® GS produced by Sumitomo Chemical Co., Ltd.

Since excessive addition of these polymerization inhibitors will lower the curable jettable liquid sensitivity to curing, it is preferred that the amount capable of preventing polymerization be determined prior to blending. The amount of a polymerization inhibitor is generally between 200 and 20,000 ppm of the total curable jettable liquid weight.

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholinopropane-1-on or 2-methyl-1[4-(methylthio)phenyl]-2-morpholinopropane-1-on and diethylthioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE® 800 and ACTILANE® 725 available from AKZO NOBEL, Ebecryl® P115 and Ebecryl® 350 available from UCB CHEMICALS and CD 1012, Craynor CN 386 (amine modified acrylate) and Craynor CN 501 (amine modified ethoxylated trimethylolpropane triacrylate) available from CRAY VALLEY.

The content of the synergist additive is in the range of 0 to 50 wt %, preferably in the range 5 to 35 wt % based on the total weight of the curable jettable liquid.

Plasticizers

Plasticizers are usually used to improve the plasticity or to reduce the hardness of adhesives, sealing compounds and coating compositions. Plasticizers are liquid or solid, generally inert organic substances of low vapor pressure.

Suitable plasticizers include modified and unmodified natural oils and resins, alkyl, alkenyl, arylalkyl or arylalkenyl esters of acids, such as alkanoic acids, arylcarboxylic acids or phosphoric acid; synthetic oligomers or resins such as oligostyrene, oligomeric styrene-butadiene copolymers, oligomeric .alpha.-methylstyrene-p-methylstyrene copolymers, liquid oligobutadienes, or liquid oligomeric acrylonitrile-butadiene copolymers; and also polyterpenes, polyacrylates, polyesters or polyurethanes, polyethylene, ethylene-propylene-diene rubbers, α-methyloligo(ethylene oxide), aliphatic hydrocarbon oils, e.g., naphthenic and paraffinic oils; liquid polydienes and liquid polyisoprene.

Examples of particularly suitable plasticizers are paraffinic mineral oils; esters of dicarboxylic acids, such as dioctyl adipate or dioctyl terephthalate; naphthenic plasticizers or polybutadienes having a molar weight of between 500 and 5000 g/mol.

More particularly preferred plasticizers are Hordaflex® LC50 available from HOECHST, Santicizer® 278 available from MONSANTO, TMPME available from PERSTORP AB, and Plasthall 4141 available from C. P. Hall Co.

It is also possible to use a mixture of different plasticizers.

The amount of a plasticizer present in the curable jettable liquid is chosen by the skilled worker and is preferably present in a concentration of at least 5 wt %, particularly preferably at least 10 wt %, most preferably at least 15 wt %, each based on the total weight of the curable jettable liquid.

Preferred plasticizers are liquids having molecular weights of less than 5000, but can have molecular weights up to 30000.

Elastomers

The elastomer can be a single binder or a mixture of various binders. The elastomeric binder is an elastomeric copolymer of a conjugated diene-type monomer and a polyene monomer having at least two non-conjugated double bonds, or an elastomeric copolymer of a conjugated diene-type monomer, a polyene monomer having at least two non-conjugated double bonds and a vinyl monomer copolymerizable with these monomers. The monomer constituting the skeleton of these elastomeric copolymers includes, for example, conjugated diene-type monomers such as 1,3-butadiene, isoprene, 2,3-dimethylbutadiene, 1,3-pentadiene and chloroprene; and vinyl monomers such as aromatic vinyl monomers such as styrene and alpha-methylstyrene, unsaturated nitrile monomers such as acrylonitrile, methacrylonitrile and alpha-chloroacrylonitrile. The vinyl monomers are not limited to these specific examples, and may be any of conjugated diene-type monomers and vinyl monomers copolymerizable with polyene monomers shown below.

Highly preferred elastomeric polymers are polyalkadienes, vinylaromatic/alkadiene-copolymers and -blockcopolymers, alkadiene-acrylonitrile-copolymers, ethylene-propylene-copolymers, ethylene-propylene-alkadiene-copolymers, ethylene-(acrylic acid)-copolymers, alkadiene-(acrylic acid)-copolymers, alkadiene-acrylate-(acrylic acid)-copolymers and ethylene-((meth)acrylic acid)-(meth)acrylate-copolymers.

Surfactants

The curable jettable liquid according to the present invention may contain at least one surfactant. The surfactant(s) can be anionic, cationic, non-ionic, or zwitter-ionic and are usually added in a total quantity below 20 wt % based on the total curable jettable liquid weight and particularly in a total below 10 wt % based on the total curable jettable liquid weight.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Colorants

Colorants may be dyes or pigments or a combination thereof. Organic and/or inorganic pigments may be used.

Dyes suitable for the curable jettable liquid according to the present invention include direct dyes, acidic dyes, basic dyes and reactive dyes.

Pigments suitable for the curable jettable liquid according to the present invention include as red or magenta pigments: Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15: 1, 15: 2, 15: 3, 15: 4, 15: 6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as white pigment: Pigment White 6, 18, and 21.

Furthermore, the pigment may be chosen from those disclosed by HERBST, W, et al. Industrial Organic Pigments, Production, Properties, Applications. 2nd edition. VCH, 1997.

Suitable black pigment materials include carbon blacks such as Pigment Black 7 (e.g. Carbon Black MA8® from MITSUBISHI CHEMICAL), Regal® 400R, Moguls L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. Additional examples of suitable pigments are disclosed in U.S. Pat. No. 5,538,548 (BROTHER).

The pigment is present in the range of 0.01 to 10 wt %, preferably in the range 0.1 to 5 wt % based on the total weight of curable jettable liquid.

Solvents

The curable jettable liquid according to the present invention preferably does not contain an evaporable component, but sometimes, it can be advantageous to incorporate an extremely small amount of a solvent to improve adhesion to the ink-receiver surface after UV curing. In this case, the added solvent can be any amount in the range of 0.1 to 10.0 wt %, and preferably 0.1 to 5.0 wt %, each based on the total weight of curable jettable liquid.

Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used. A preferred organic solvent is ethylacetate.

Humectants

When a solvent is used in the curable jettable liquid according to the present invention, a humectant may be added to prevent the clogging of the nozzle, due to its ability to slow down the evaporation rate of curable jettable liquid.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof, with a polyethylene glycol being particularly preferred. A humectant is preferably added to the curable jettable liquid formulation in an amount of 0.01 to 20 wt % of the formulation, more preferably 0.1 to 10 wt % of the formulation.

Biocides

Suitable biocides for the curable jettable liquid according to the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for the curable jettable liquid of the present invention is Proxel® GXL available from ZENECA COLOURS.

A biocide is preferably added in an amount of 0.001 to 3 wt. %, more preferably 0.01 to 1.00 wt. %, each based on curable jettable liquid.

Preparation of a Curable Jettable Liquid

A dispersion of colorant for use in the curable jettable liquid according to the present invention may be prepared by mixing, milling and dispersion of colorant and resin. Mixing apparatuses may include a pressure kneader, an open kneader, a planetary mixer, a dissolver, and a Dalton Universal Mixer. Suitable milling and dispersion apparatuses are a colloid mill, a high-speed disperser, double rollers, a bead mill, a paint conditioner, and triple rollers.

In the process of mixing, milling and dispersion, each process is performed with cooling to prevent build up of heat, and as much as possible under light conditions in which UV-light has been substantially excluded.

Ink-Receiver

The curable jettable liquid according to the present invention is jetted on an ink-receiver surface. The ink-receiver comprises a flexible support and usually at least one photopolymerizable layer, which may be partially or fully polymerized.

Support

The support can be any flexible material that is conventionally used with photosensitive elements used to prepare flexographic printing plates. For good printing results, a dimensionally stable support is required.

Preferably the support is transparent to actinic radiation to accommodate "backflash" exposure through the support. Examples of suitable support materials include polymeric films such those formed by addition polymers and linear condensation polymers, transparent foams and fabrics. Under certain end-use conditions, metals such as steel, aluminum, copper and nickel, may also be used as a support, even though a metal support is not transparent to radiation. The support may be in sheet form or in cylindrical form, such as a sleeve. The sleeve may be formed from single layer or multiple layers of flexible material, as for example disclosed by US 20020046668 A (ROSSINI). Flexible sleeves made of polymeric films are preferred, as they typically are transparent to ultraviolet radiation and thereby accommodate backflash exposure for building a floor in the cylindrical printing element. Multiple layered sleeves may include an adhesive layer or tape between the layers of flexible material. Preferred is a multiple layered sleeve as disclosed in U.S. Pat. No. 5,301,610 (DU PONT). The sleeve may also be made of non-transparent, actinic radiation blocking materials, such as nickel or glass epoxy. The support typically has a thickness from 0.002 to 0.050 inch (0.0051 to 0.127 cm). A preferred thickness for the sheet form is 0.003 to 0.016 inch (0.0076 to 0.040 cm). The sleeve typically has a wall thickness from 10 to 80 mils (0.025 to 0.203 cm) or more. Preferred wall thickness for the cylinder form is 10 to 40 mils (0.025 to 0.10 cm).

Preferred polymeric supports for use with the curable jettable liquid according to the present invention, are cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable supports can be found in Modern Approaches to Wettability: Theory and Applications. Edited by SCHRADER, Malcolm E., et al. New York: Plenum Press, 1992. ISBN 0306439859.

Photopolymerizable Layer

The photopolymerizable layer is applied to a dimensionally stable support with or without an adhesion layer.

The photopolymerizable layer consists of a photopolymerizable composition, which is hardened by exposure to actinic light. This may be carried out by photocrosslinking of polymers, by photopolymerizing monomers and/or oligomers, or by both methods.

Preferred photopolymerizable layers contain at least one polymeric binder which can be washed out in the developer, at least one ethylenically unsaturated, free-radically polymerizable compound, at least one photo-initiator or photo-initiator system, and, optionally, further additives. The composition of such layers is known in principle and is described, for example, in U.S. Pat. No. 3,960,572 (ASAHI), U.S. Pat. No. 3,951,657 (UPJOHN), U.S. Pat. No. 4,323,637 (DU PONT) and U.S. Pat. No. 4,427,759 (DU PONT).

The at least one polymeric binder is preferably an elastomer. Suitable elastomers are described above for the "Curable jettable liquid".

The photopolymerizable mixtures further comprise at least one ethylenically unsaturated, free-radically polymerizable compound, i.e. a monomer or an oligomer. Suitable monomers and oligomers are described above for the "Curable jettable liquid".

Suitable photo-initiators for the photopolymerization are described above for the "Curable jettable liquid".

The photopolymerizable composition generally contains from 45 to 95% by weight of the binder based on the sum of all constituents. Preferably, from 70 to 95% by weight of the binder is employed. The amount of polymerizable compounds is from 4.9 to 45% by weight, preferably between 4.9 and 30% by weight. The amount of photo-initiator is from 0.1 to 5% by weight.

The photopolymerizable composition may further comprise at least one plasticizer. It is also possible to use a mixture of different plasticizers. Suitable plasticizers are described above for the "Curable jettable liquid". The amount of plasticizer present is generally below 40% by weight based on the sum of all constituents of the photopolymerizable composition.

The photopolymerizable composition may further include other additives, such as, inhibitors of heat-initiated polymerization, dyes, pigments, photochromic additives, anti-oxidants, antiozonants and extrusion aids, e.g. α-methylstyrene-vinyltoluene copolymers. The amount of additives is preferably less than 20% by weight based on the sum of all constituents of the photopolymerizable composition, and is advantageously chosen so that the overall amount of plasticizer and additives does not exceed 50% by weight based on the sum of all the constituents.

The thickness of the photopolymerizable layer is chosen by the skilled worker in accordance with the requirements of the desired application. Generally, the thickness varies from 0.05 to 7 mm.

Elastomeric Floor

In preparing conventional flexographic printing plates, a first step is a back exposure or backflash step. This is a blanket exposure to actinic radiation through the support. It is used to create a layer of polymerized material, or an elastomeric floor, on the support side of the photopolymerizable layer and to sensitize the photopolymerizable layer. The elastomeric floor provides improved adhesion between the photopolymerizable layer and the support, helps highlight dot resolution and also establishes the depth of the plate relief. The backflash exposure can take place before, after or during the step of jetting the curable jettable liquid. It is preferred that it takes place before or after jetting the curable jettable liquid to prevent clogging of the nozzles.

Unlike conventional flexographic printing plates, the elastomeric floor in the present invention may comprise the whole photopolymerizable layer(s). However, to improve the adhesion of the curable jettable liquid on a photopolymerizable layer, it may be advantageous to perform only a partial curing of the photopolymerizable layer.

Suitable photopolymerizable layer(s) on a support include the conventional flexographic printing plate precursors, such as Cyrel® PLS, Cyrel® HIQ available from DU PONT and FAH-114 available from BASF.

Suitable materials for use as an elastomeric floor include microcellular urethanes with an open-cell structure, e.g. PORON® and R/Bak® available from ROGERS Corp.; natural rubber (polyisoprene), e.g. rubber plate ERIKS Luna Para available from ERIKS; mixtures of natural and styrene-butadiene rubber, e.g. rubber plates ERIKS Norma and ERIKS Blanca; chloroprene rubber, e.g. rubber plate ERIKS Neoprene®; EPDM or ethylene-propylene diene modified rubbers, e.g. rubber plate ERIKS EPDM®; NBR or copolymers comprising butadiene and acrylonitrile, e.g. rubber plate ERIKS Superba and Neo-benzid; fluorocarbon polymer plates, e.g. ERIKS Viton® all available from ERIKS.

A support may or may not be attached to the elastomeric floor. An adhesive layer may be present on the elastomeric floor.

Flexographic Printing Master

The curable jettable liquid according to the present invention is applied on an ink-receiver surface with a means for jetting, creating an uncured printed image. Subsequently, this printed image is cured by a curing means to produce a flexographic printing master. The flexographic printing master may have any form, e.g. a sheet form, such as a printing plate, or a cylindrical form, such as a sleeve.

The layer of the curable jettable liquid after curing has an elongation at break of at least 5%, particularly preferably of at least 25%.

The layer of the curable jettable liquid after curing has a storage modulus E' smaller than 200 mPa at 30 Hz, particularly preferably smaller than 50 mPa at 30 Hz.

The layer of the curable jettable liquid after curing has a volumetric shrinkage smaller than 10%, particularly preferably smaller than 8%.

Means for Jetting

The curable jettable liquid according to the present invention is jetted by means comprising a printing head ejecting small droplets of the curable jettable liquid in a controlled manner through nozzles onto an ink-receiver surface, which is moving relative to the printing head(s). The ejected or jetted curable jettable liquid forms an image on the ink-receiver surface.

A preferred printing head for jetting the curable jettable liquid according to the present invention, is a piezoelectric head. Piezoelectric ink-jet printing is based on the movement of a piezoelectric ceramic transducer when a voltage is applied thereto. Application of a voltage changes the shape of the piezoelectric ceramic transducer in the printing head creating a void, which is then filled with curable jettable liquid. When the voltage is removed, the ceramic expands to its original shape, ejecting a droplet of curable jettable liquid from the print head.

The means for jetting a curable jettable liquid according to the present invention is however not restricted to a piezoelectric ink-jet printing head. Other ink-jet printing heads for curable jettable liquid ejection can be used and include various types, such as a continuous types and thermal, electrostatic and acoustic drop on demand types.

Curing Means

The curable jettable liquid according to the present invention jetted on an ink-receiver surface is preferably cured by radiation or electron beam exposure. A preferred means of radiation curing is ultraviolet light.

For the backflash step, the actinic radiation exposure time can vary from a few seconds to minutes, depending upon the intensity and spectral energy distribution of the radiation, its distance from the photopolymerizable layer, the desired image resolution, and the nature and amount of the photopolymerizable composition. Exposure temperatures are preferably ambient or slightly higher, i.e. about 20 to 35° C. Exposure is of sufficient duration to cross-link the exposed areas down to the support or to the back exposed layer.

Actinic radiation sources encompass the ultraviolet and visible wavelength regions. The suitability of a particular actinic radiation source is governed by the photosensitivity of the initiator and the monomers used in preparing the flexographic printing plates. The preferred photosensitivity of most common flexographic printing plates are in the UV and deep UV area of the spectrum, as they afford better room-light stability. Examples of suitable visible and UV sources include carbon arcs, mercury-vapor arcs, fluorescent lamps, electron flash units, electron beam units, lasers, and photographic flood lamps. The most suitable sources of UV radiation are the mercury vapor lamps, particularly the sun lamps. Examples of industry standard radiation sources include the Sylvania 350 Blacklight fluorescent lamp (FR48T12/350 VL/VHO/180, 115 w), and the Philips UV-A "TL"-series low-pressure mercury-vapor fluorescent lamps. Typically, a mercury vapor arc or a sunlamp can be used at a distance of about 1.5 to about 60 inches (about 3.8 to about 153 cm) from the photopolymerizable layer. These radiation sources generally emit long-wave UV radiation between 310-400 nm. Flexographic printing plates sensitive to these particular UV sources use initiators that absorb between 310-400 nm;

The curing means for the curable jettable liquid according to the present invention may be arranged in combination with the print head of the ink-jet printer, travelling therewith so that images printed upon the surface of the ink-receiver are exposed to curing radiation very shortly after having been printed on the ink-receiver surface. In such an arrangement it can be difficult to provide a small compact radiation source connected to and travelling with, the print head. Therefore, a static fixed radiation source may be employed, e.g. a source of curing UV radiation, connected to the radiation source by means of flexible radiation conductive means such as a fibre optic bundle or an internally reflective flexible tube.

Alternatively, the curing radiation may be supplied from a fixed source to the radiation head by an arrangement of mirrors including a mirror on the radiation head.

A source of radiation arranged not to move with the print head, may also be an elongate radiation source extending transversely across the ink-receiver surface to be cured and adjacent to the transverse path of the print head so that the subsequent rows of images formed by the print head are passed, stepwise or continually, beneath the radiation source.

In practice, it may be desirable to provide a plurality of print heads in relative close proximity in a printing station, for realizing a high printing speed. In that case, each has its own dedicated radiation source.

Any ultraviolet light source may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm.

Furthermore, it is possible to cure the printed image using two light sources of differing wavelength or illuminance. For example, the first UV source can be selected to be rich in UV-C, in particular in the range of 240 nm-200 nm. The second UV source can then be rich in UV-A, e.g. a gallium-doped lamp, or a different lamp high in both UV-A and UV-B. The use of two UV sources has been found to have advantages e.g. a faster curing speed.

For facilitating curing, the ink-jet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

The present invention will now be described in detail by way of Examples hereinafter.

Materials

All materials used in the following examples were readily available from Aldrich Chemical Co. (Belgium) unless otherwise specified.

The following materials were used:

Radiation Sensitive Compounds

Actilane® 411 is a cyclic trimethylolpropane formal acrylate available from AKZO.

Craynor® CN 501 is an amine modified ethoxylated trimethylolpropane triacrylate available from CRAY VALLEY.

DPGDA® is a dipropylene glycol diacrylate available from UCB.

Ebecryl® 11 is a polyethylene glycol diacrylate available from UCB.

Ebecryl® 168 is an acid modified methacrylate available from UCB.

Ebecryl® 350 is a silicone diacrylate available from UCB.

Ebecryl® 770 is an acid functional polyester acrylate diluted with 40% HEMA available from UCB.

Ebecryl® 1360 is a polysiloxane hexa acrylate available from UCB.

Sartomer® 506D is an isobornyl acrylate available from CRAY VALLEY.

Irgacure® 500, Irgacure® 819 and Irgacure® 907 are photo-initiators available from CIBA SPECIALTY CHEMICALS.

PVS225 is a 40/60 mixture of Craynor® CN 501 and DPGDA® containing 10 wt % of methylhydroquinone.

MHQ is DPGDA® containing 5 wt % of methylhydroquinone.

Elastomers

Kraton® grades and Cariflex® grades are available from SHELL Co.

Hycar® grades, Estane® grades and Hydrin® grades are all available from GOODRICH.

Breon® grades are available from BRITISH GEON Ltd.

Plasticizers

Hordaflex® LC50 is available from HOECHST.

Santicizer® 278 is available from MONSANTO.

TMPME is Trimethylolpropane Monoallyl Ether available from PERSTORP AB.

Dyes

Yellow dye is 2-(4-{Butyl-[4-(2-methoxy-ethoxy)-phenyl]-amino}-benzylidene)-malononitrile available from AGFA.

Magenta dye is 2-Cyano-3-(4-dibutylamino-phenyl)-but-2-enedinitrile available from AGFA.

Surfactants/Leveling Agents

Perenol® S is 50 wt % solution of Perenol® S Konz. (available from COGNIS) in ethyl acetate.

Mersolat® H is a mixture of secondary alkane sulfonates from BAYER.

Other Materials

Kieselsol® 100F is a 30% dispersion of $SiO_2$ in water from BAYER.

AGFA PET is a 100 μm PET film available from AGFA, coated with a subbing layer, manufactured by applying a solution, consisting of 246 mL of a 32% latex based on a copolymer of 88 wt % vinylidene chloride, 10 wt % methylacrylate and 2 wt % itaconic acid, 48 mL of Kieselsol® 100F-30 and 10 mL of a 4.85 wt % solution in water of Mersolat® H, and 696 mL of demineralized water, by air knife coating to a uniaxially oriented PET (130 $m^2$/l), drying at 150° C. air temperature and stretching in a transversal direction (factor 3.6).

Lumirror X43 is a 125 μm PET film available from TORAY INDUSTRIES.

Measurement Methods

1. Solubility

The solubility of an elastomer in a UV-curable ink-jet ink was tested by mixing the elastomer and the UV-curable ink-jet ink. An elastomer was considered to be insoluble in a UV-curable ink-jet ink, if it is not possible to prepare a clear, homogeneous ink containing 16 wt % of the elastomer based on the total ink weight.

2. Shelf-Life

The shelf-life of a curable jettable liquid was tested by keeping the curable jettable liquid in a glass container at 20° C. under light conditions in which UV-light has been substantially excluded and evaluating two weeks later the homogeneity of the curable jettable liquid.

3. Jettability

The possibility for jetting the curable jettable liquid was evaluated using a UPH 110 printhead from AGFA at 60° C. on a Professional Glossy Paper from EPSON.

4. Viscosity

The viscosity of the curable jettable liquids was measured with a programmable DV-II+ Digital viscometer from BROOKFIELD using a Wells-Brookfield Cone/Plate geometry at 60° C. and a shear rate of 100 $s^{-1}$, unless otherwise specified.

5. Bending Test

The coated samples were bent over an angle of 90° after curing and the resistance to cracking was evaluated in accordance with a criterion described below.

Criterion:

1=excellent flexibility, no cracking at all

2=moderate flexibility, only minor cracks (visible using a microscope)

3=inferior flexibility, large cracks (visible with the naked eye)

4=unacceptable flexibility, very fragile and extremely brittle, glassy layers

6. Dmax

The maximum optical density was measured using a MacBeth RD918SB densitometer with a filter complementary to the colour of the printing ink used.

7. Mottle

The printed samples were examined in reflection mode with a 6× magnifying loupe under a TL-light source. The samples were ranked for their mottle appearance according to the following scale:

Grade=12: extremely gross mottle

Grade=11: noticeably better than Grade=12

Grade=10: noticeably better than Grade=11

Grade=9: noticeably better than Grade=10

Grade=8: noticeably better than Grade=9

Grade=7: noticeably better than Grade=8

Grade=6: noticeably better than Grade=7

Grade=5: noticeably better than Grade=6

Grade=4: noticeably better than Grade=5

Grade=3: noticeably better than Grade=4

Grade=2: noticeably better than Grade=3, barely perceptible mottle

Grade=1: noticeably better than Grade=2, no perceptible mottle

8. Elongation at Break

The elongation at break was measured using a tensile testing machine Instron Series IX Automated from INSTRON on samples with a thickness of 0.4 mm and a size of 100 mm×20 mm.

9. Storage Modulus E'

The storage modulus E' was determined at 30 Hz using a DMA2980 from TA Instruments in tension mode at a constant temperature of 30° C. with a frequency sweep from 100 Hz to 0.1 Hz and an oscillation amplitude of 15 μm.

10. Volumetric Shrinkage

The measurement of the density of the curable jettable liquid before and after curing permitted an evaluation of the shrinkage due to polymerization by using the formula:

$$\%\ \text{Volumetric shrinkage} = \left[\frac{\text{Density of cured ink}}{\text{Density of uncured ink}} \times 100\right] - 100$$

The density of the uncured curable jettable liquid was measured at 25° C. with a density meter DMA45 from ANTON PAAR. The density of the cured curable jettable liquid was measured with a pycnometer Accupyc 1330 from MICROMERITICS.

Example 1

This example illustrates the problems to incorporate an elastomer in curable jettable liquids.

A large number of elastomers were tested on their solubility in a typical UV-curable ink-jet ink INK-1. For simplicity, a colorant was not added to INK-1, which composition is given by Table 1.

TABLE 1

| INK-1 | wt % based on total ink weight |
|---|---|
| Craynor ® CN 501 | 34.4 |
| DPGDA ® | 51.6 |
| PVS225 | 2.0 |
| Irgacure ® 907 | 10.0 |
| Ethylacetate | 2.0 |

The solubility of the elastomers of Table 2 was tested in the UV-curable ink-jet ink INK-1 by addition in an amount of 16 wt % of the elastomer based on the total ink weight.

TABLE 2

| Elastomer | Type of copolymer | Solubility |
|---|---|---|
| Kraton ® D-1184 | Styrene/Butadiene (Branched) | Insoluble |
| Kraton ® D-1102 | Styrene/Butadiene (Linear) | Insoluble |
| Kraton ® G-1652 | Styrene/Ethylene/Butylene (linear) | Insoluble |
| Kraton ® G-1657 | Styrene/Ethylene/Butylene | Insoluble |
| Cariflex ® TR226 | Styrene/Butadiene | Insoluble |
| Kraton ® EPK205 | Ethylene/Butylene/Isoprene | Insoluble |
| Kraton ® liquid polymer EPK207 | Ethylene/Butylene/Epoxidized Isoprene | Insoluble |
| Estane ® TPU | Polyesterurethane based on adipic acid & 1,4-butanediol-4,4'-diphenyldiisocyanate | Insoluble |
| Hycar ® 1022 | Acrylonitrile/Butadiene rubber | Insoluble |
| Hycar ® 1052 | Acrylonitrile/Butadiene rubber | Insoluble |
| Breon ® 1042 | Acrylonitrile/Butadiene rubber | Insoluble |
| Hycar ® 2057P | Styrene/Butadiene rubber | Insoluble |
| Hycar ® 1014 | Acrylonitrile/Butadiene rubber | Insoluble |
| Hycar ® 1024 | Acrylonitrile/Butadiene rubber | Insoluble |
| Hycar ® 1043 | Acrylonitrile/Styrene rubber | Insoluble |
| Hydrin ® 200 | Epichlorhydrin/Ethyleneoxide) | Insoluble |
| Hycar ® 4021 | Co(Ethylacrylate-2-Chloroethyl-Vinylether) | Insoluble |
| Hycar ® 2000X164VTB | Butadiene copolymer | Insoluble |
| Cariflex ® K101 | Styrene/Butadiene | Insoluble |
| Kraton ® D1161 | Styrene-B-Isoprene blockcopolymer | Insoluble |
| Kraton ® D1163 | Styrene-B-Isoprene blockcopolymer | Insoluble |
| Kraton ® D1165 | Styrene-B-Isoprene blockcopolymer | Insoluble |
| Kraton ® G1726 | Styrene/Ethylene/Butylene | Insoluble |
| Kraton ® L1253 | Ethylene/Butylene | Insoluble |
| Kraton ® FG1901 | Styrene/Ethylene/Butylene | Insoluble |

From Table 2 it is clear that none of the elastomers are directly soluble in the radiation curable composition.

Therefore, an indirect method for incorporating the elastomer in the UV-curable ink-jet ink INK-1 was tried, comprising the steps:

Selecting a suitable organic solvent

Dissolving the elastomer in the selected solvent

Mixing the elastomer solution with the UV-curable ink-jet ink INK-1

Evaporating the solvent with a rotary evaporator at 60° C.

Curable jettable liquids were prepared with the indirect method using the elastomer solutions of Table 3 to contain 16 wt % of elastomer.

TABLE 3

| Elastomer | Organic solvent | Shelf-life | Jettability |
|---|---|---|---|
| Kraton ® D-1184 | Ethylacetate | Phase-separation | Not possible |
| Kraton ® D-1102 | n-Hexane | Phase-separation | Not possible |
| Cariflex ® TR226 | 1/1 of Ethylacetate/MEK | Phase-separation | Not possible |
| Cariflex ® TR226 | 1/1 of n-Hexane/MEK | Phase-separation | Not possible |
| Estane ® TPU | Ethylacetate | Phase-separation | Not possible |
| Hycar ® 4021 | Ethylacetate | Phase-separation | Not possible |
| Hycar ® 1052 | Dichloro-methane | Phase-separation | Not possible |
| Hycar ® 1022 | Ethylacetate | Phase-separation | Not possible |
| Hydrin ® 200 | Ethylacetate | Phase-separation | Not possible |
| Hycar ® 1024 | Ethylacetate | Phase-separation | Not possible |
| Hycar ® 1024 | 1/1 of n-Hexane/MEK | Phase-separation | Not possible |
| Hycar ® 2000X164VTB | MEK | Phase-separation | Not possible |
| Cariflex ® K101 | 1/1 of n-Hexane/MEK | Phase-separation | Not possible |

From Table 3 it is clear that it is not possible to make a stable curable jettable liquid with the listed elastomers. Other experiments showed that a change in monomer composition of the curable jettable liquid did also not result in stable curable jettable liquids. The viscosity of the elastomer containing curable jettable liquids of Table 3 was also much too high for jettability. For example, the curable jettable liquid containing 16 wt % of Cariflex® TR226 had a viscosity of over 100 mPa·s at 60° C., while INK-1 containing no elastomer had a viscosity of 10 mPa·s at 60° C.

The printing properties of curable jettable liquids containing an elastomer were tested by coating these fluids at a thickness of 300 μm on a pre-cured and processed FAH-114 plate from BASF. The coated samples COAT-1 to COAT-5 with a composition according to Table 4 were cured five times in a Model DRSE-120 Conveyor from FUSION UV SYSTEMS Ltd. equipped with a D-bulb at 20 m/min. Mechanically engraved grooves with various relief depths from 0.2 to 0.7 mm were then applied in order to simulate an imaged and processed flexographic printing plate.

TABLE 4

| wt % of | COAT-1 | COAT-2 | COAT-3 | COAT-4 | COAT-5 |
|---|---|---|---|---|---|
| INK-1 | 71.4 | 71.4 | 71.4 | 76.9 | 69.0 |
| Cariflex ® TR226 | 14.3 | 14.3 | 14.3 | 23.1 | 31.0 |
| Hordaflex ® LC50 | 14.3 | — | — | — | — |
| Santicizer ® 278 | — | 14.3 | — | — | — |
| TMPME | — | — | 14.3 | — | — |

The obtained flexographic printing plates were compared with two commercial flexographic printing plates BASF FAH114 (REF-1) and DU PONT Cyrel® PLS-67 (REF-2) on a label press Allied 300 Series from ALLIED GEAR AND MACHINE Co. The anilox roller of this flexo press was an Ultracell laser engraved roller (220 l/cm-3.95 ml/$m^3$). The printing ink, used at a printing speed of 40 m/min, was Hydrokett 2000 Cyan available from AKZO-NOBEL. The two substrates used for printing were a 120 g/$m^2$ cast coated paper SPX80/GLAR63P10 available from AR CONVERT and a 90 g/$m^2$ uncoated woodfree paper.

TABLE 5

| | | Printing results | | | |
|---|---|---|---|---|---|
| | Bending | Cast coated paper | | Uncoated woodfree paper | |
| Plate | test | Dmax | Mottle | Dmax | Mottle |
| REF-1 | 1 | 1.60 | 4 | 0.96 | 5 |
| REF-2 | 1 | 1.56 | 4 | 0.95 | 5 |
| COAT-1 | 3 | 1.32 | 10 | 0.69 | 10 |
| COAT-2 | 4 | 1.33 | 8 | 0.65 | 10 |
| COAT-3 | 4 | 1.32 | 8 | 0.71 | 9 |
| COAT-4 | 4 | 1.24 | 11 | 0.78 | 9 |
| COAT-5 | 3 | 1.36 | 8 | 0.63 | 11 |

From Table 5 it is clear that the samples COAT-1 to COAT-5 exhibited an inadequate printing ink laydown since the Dmax was too low and the degree of mottle was too high compared to the commercial plates REF-1 and REF-2. From the bending test it was clear that the pliability and flexibility of samples COAT-1 to COAT-5 were unsatisfactory. The incorporation of a plasticizer did not improve the printing results. It should be clear that the curable jettable liquids COAT-1 to COAT-5 did not contain a monofunctional monomer.

Example 2

This example illustrates the necessity of a plasticizer in the jettable liquid to manufacture a flexographic printing plate of high quality with a jettable liquid containing a monofunctional monomer, a polyfunctional monomer and/or oligomer and a photo-initiator.

Curable Jettable Liquid

Crystal UFE inks are described by SUN CHEMICALS as UV curable inks with enhanced flexibility. In EP 1428666 A (AGFA), the UV curable black ink, Crystal UFE® 7577, was used to make a flexographic printing plate. In this example the similar cyan ink, Crystal UFE® 5562, was used to prepare the comparative curable jettable liquids COMP-1 and COMP-2 according to Table 6. The comparative curable jettable liquid COMP-3 and the inventive curable jettable liquid INV-1 were also prepared according to Table 6.

TABLE 6

| Compound | COMP-1 | COMP-2 | COMP-3 | INV-1 |
|---|---|---|---|---|
| Crystal UFE ® 5562 | 100.00 g | 87.50 g | — | — |
| Sartomer ® 506D | — | — | 38.40 g | 38.40 g |
| Ebecryl ® 11 | — | — | 18.60 g | 18.60 g |
| Ebecryl ® 168 | — | — | 8.80 g | 8.80 g |
| Ebecryl ® 770 | — | — | 17.60 g | 17.60 g |
| Sanctizer ® 278 | — | 12.50 g | — | 12.50 g |
| Irgacure 500 | — | — | 5.00 g | 5.00 g |
| MHQ | — | — | 0.25 g | 0.25 g |
| Perenol S | — | — | 1.25 g | 1.25 g |
| Ethyl acetate | — | — | 2 g | 2 g |
| Total = | 100.00 g | 100.00 g | 100.00 g | 112.50 g |

Preparation of Flexographic Plate

The comparative curable jettable liquids COMP-1 to COMP-3 and the inventive curable jettable liquid INV-1 were coated on a Lumirror X43 PET film using a bar coater and a 30 μm wired bar. Each coated layer was cured using a Fusion DRSE-120 conveyer, equipped with a Fusion VPS/1600 lamp (D-bulb), which transported the samples under the UV lamp on a conveyer belt at a speed of 20 m/min. This procedure was repeated until a printing plate with a cured layer at a thickness of 400 μm was obtained. The coated samples were evaluated for elongation at break, storage modulus and volumetric shrinkage.

For the bending test, the comparative curable jettable liquids COMP-1 to COMP-3 and the inventive curable jettable liquid INV-1 were coated and cured at a thickness of 290 μm on a fully cured and standard processed Du Pont Cyrel® PLS printing plate.

The results are shown in Table 7.

TABLE 7

| Printing plate made with liquid | Elongation at break | Storage Modulus E' (at 30 Hz) | Volumetric Shrinkage | Bending Test |
|---|---|---|---|---|
| COMP-1 | 11% | 291 | 9% | 3 |
| COMP-2 | 9% | 94 | 9% | 3 |
| COMP-3 | 91% | 514 | 13% | 1 |
| INV-1 | 88% | 135 | 9% | 1 |

Table 7 shows that only the inventive curable jettable liquid INV-1 produces a flexographic printing plate with a low volumetric shrinkage and a high flexibility.

Example 3

This example illustrates the effect of photo-initiators used in the curable jettable liquid on the properties of the flexographic printing plate.

Curable Jettable Liquid

Three curable jettable liquids in accordance with the present invention were prepared with a composition as shown in Table 8.

TABLE 8

| Compound | INV-2 | INV-3 | INV-4 |
|---|---|---|---|
| Sartomer ® 506D | 49.10 | 49.10 | — |
| Actilane ® 411 | — | — | 66.80 |
| Ebecryl ® 350 | 29.50 | 29.50 | — |
| Ebecryl ® 1360 | — | — | 11.80 |
| Sanctizer ® 278 | 12.50 | 12.50 | 12.50 |
| Irgacure ® 500 | 4.90 | — | 4.90 |
| Irgacure ® 819 | — | 4.90 | — |
| MHQ | 0.25 | 0.25 | 0.25 |
| Ethyl acetate | 2.00 | 2.00 | 2.00 |
| Yellow dye | 0.18 | 0.18 | 0.18 |
| Magenta dye | 0.36 | 0.36 | 0.36 |
| Perenol ® S | 1.21 | 1.21 | 1.21 |
| Viscosity (mPa · s) | 8.1 | 8.2 | 8.5 |

Preparation of Flexographic Plate

The inventive curable jettable liquids INV-2 to INV-4 were coated on AGFA PET at a thickness of 250 μm and the coated samples were cured five times in a Model DRSE-120 Conveyor from FUSION UV SYSTEMS Ltd. Equipped with a D-bulb at 20 m/min. The coated samples were evaluated for elongation at break, storage modulus and bending and compared with a cured and processed Cyrel® HIQ flexographic printing plate from DU PONT. The results are shown in Table 9.

TABLE 9

| Printing plate | Bending test | Elongation at break | Storage Modulus E' |
|---|---|---|---|
| made using liquid INV-2 | 1 | 27% | 3.5 mPa |
| made using liquid INV-3 | 1 | 80% | 22.0 mPa |
| made using liquid INV-4 | 2 | 38% | 51.0 mPa |
| Cyrel ® HIQ | 1 | 165% | 3.5 mPa |

From Table 9 it is clear that the photo-initiator selected for curing the curable jettable liquid clearly influences the elongation at break and the storage modulus, as it is also the case for the selected monomers and oligomers.

Example 4

This example illustrates the effect of the amount of plasticizer used in the curable jettable liquid on the volumetric shrinkage.

Curable Jettable Liquid

The comparative curable jettable liquids COMP-4 and COMP-5 and the inventive curable jettable liquids INV-5 and INV-6 were prepared according to Table 10.

TABLE 10

| Compound | COMP-4 | COMP-5 | INV-5 | INV-6 |
|---|---|---|---|---|
| Sartomer ® 506D | 38.40 g | 38.40 g | 38.40 g | 38.40 g |
| Ebecryl ® 11 | 18.60 g | 18.60 g | 18.60 g | 18.60 g |
| Ebecryl ® 168 | 8.80 g | 8.80 g | 8.80 g | 8.80 g |
| Ebecryl ® 770 | 17.60 g | 17.60 g | 17.60 g | 17.60 g |
| Sanctizer ® 278 | — | 3.00 g | 12.50 g | 25.00 g |
| Irgacure ® 500 | 5.00 g | 5.00 g | 5.00 g | 5.00 g |
| MHQ | 0.25 g | 0.25 g | 0.25 g | 0.25 g |
| Perenol ® S | 1.25 g | 1.25 g | 1.25 g | 1.25 g |
| Ethyl acetate | 2 g | 2 g | 2 g | 2 g |
| Total = | 100.00 g | 103.00 g | 112.50 g | 125.00 g |

Table 11 shows that volumetric shrinkage can be reduced by increasing the amount of plasticizer. The inventive curable jettable liquids INV-5 and INV-6 produce a flexographic printing plate with a low volumetric shrinkage and a high flexibility.

Example 5

This example illustrates the advantage of a radiation curable compound with at least one acid group in the curable jettable liquid.

The inventive curable jettable liquids INV-8 to INV-11 were prepared according to Table 12 and include Ebecryl® 168 and/or Ebecryl® 770 as an acid functional monomer. The inventive curable jettable liquids INV-7 was prepared according to Table 12 and does not include an acid functional monomer. The comparative curable jettable liquids COMP-6 includes an acid functional monomer but does not contain at least 5 wt % of a polyfunctional monomer or oligomer based on the total weight of the curable jettable liquid.

TABLE 12

| Compound | INV-7 | INV-8 | INV-9 | INV-10 | INV-11 | COMP-6 |
|---|---|---|---|---|---|---|
| Sartomer ® 506D | 49.40 | 45.00 | 42.80 | 38.4 | 20.8 | — |
| Ebecryl ® 168 | — | 4.40 | 4.40 | 8.80 | 8.80 | 8.60 |
| Ebecryl ® 11 | 29.60 | 29.60 | 23.00 | 18.6 | 18.6 | — |
| Ebecryl ® 770 | — | — | 8.8 | 17.60 | 35.2 | 38.80 |
| Ebecryl ® 1039 | — | — | — | — | — | 38.20 |
| Sanctizer ® 278 | 12.50 | 12.50 | 12.50 | 12.50 | 12.50 | 12.50 |
| Irgacure ® 500 | — | — | — | — | — | 5.00 |
| Irgacure ® 819 | 5.00 | 5.00 | 5.00 | 5.00 | 5.00 | — |
| MHQ | 0.25 | 0.25 | 0.25 | 0.25 | 0.25 | 0.25 |
| Perenol ® S | 1.25 | 1.25 | 1.25 | 1.25 | 1.25 | 1.25 |
| Ethyl acetate | 2 | 2 | 2 | 2 | 2 | 2 |
| Total = | 100.00 | 100.00 | 100.00 | 100.00 | 100.00 | 100.00 |

Preparation of Flexographic Plate

The comparative curable jettable liquids COMP-4 and COMP-5 and the inventive curable jettable liquids INV-5 and INV-6 were coated on a Lumirror X43 PET film using a bar coater and a 30 μm wired bar. Each coated layer was cured using a Fusion DRSE-120 conveyer, equipped with a Fusion VPS/1600 lamp (D-bulb), which transported the samples under the UV lamp on a conveyer belt at a speed of 20 m/min. This procedure was repeated until a printing plate with a cured layer at a thickness of 400 μm was obtained. The coated samples were evaluated for volumetric shrinkage.

TABLE 11

| Printing plate obtained by using | % plasticizer | Volumetric shrinkage |
|---|---|---|
| Liquid COMP-4 | 0% | 13% |
| Liquid COMP-5 | 3% | 11% |
| Liquid INV-5 | 11% | 9% |
| Liquid INV-6 | 20% | 8% |

This example illustrates also the necessity of a mixture of at least one monofunctional monomer and at least one polyfunctional monomer or oligomer in order to manufacture a flexographic printing plate of high quality with a curable jettable liquid containing a plasticizer and a photo-initiator.

The printing properties of the inventive curable jettable liquids INV-7 to INV-11 and the comparative curable jettable liquid COMP-6 were tested by coating these fluids at a thickness of 290 μm on a pre-cured and processed Cyrel® HIQ plate from DU PONT. The coated samples according to Table 13 were cured five times in a Model DRSE-120 Conveyor from FUSION UV SYSTEMS Ltd. equipped with a D-bulb at 20 m/min. Mechanically engraved grooves with various relief depths from 0.2 to 0.6 mm were then applied in order to simulate an imaged and processed flexographic printing plate.

The obtained flexographic printing plates were compared with a DU PONT Cyrel® HIQ plate on a label press Allied 300 Series from ALLIED GEAR AND MACHINE Co. The anilox roller of this flexo press was an Ultracell laser engraved roller (220 l/cm-3.95 ml/m$^3$). The printing ink, used at a printing speed of 40 m/min, was Aqua Base Plus ET Blue ET-51405 available from ROYAL DUTCH PRINTING INK FACTORIES VAN SON. The substrate used for printing with this waterbased printing ink was Raflagloss, an off-machine coated glossy art paper for high-quality labels with multi-colour printing and high gloss finish, from RAFLATAC EUROP.

TABLE 13

| Printing plate obtained by using | Elongation at break | $D_{max}$ | Mottle |
|---|---|---|---|
| liquid INV-7 | Not measured | 1.92 | 4 |
| liquid INV-8 | Not measured | 1.92 | 4 |
| liquid INV-9 | Not measured | 1.94 | 3 |
| liquid INV-10 | Not measured | 1.96 | 3 |
| liquid INV-11 | 80% | 1.97 | 2 |
| liquid COMP-6 | <5% | 1.99 | 1 |
| Du Pont Cyrel ® HIQ | 165% | 1.95 | 2 |

From Table 13 it is clear that the flexographic printing plates obtained by using the inventive jettable liquids INV-8 to INV-11, containing an acid functional monomer, produced images with higher Dmax and lower mottle compared to the conventional flexographic printing plate Du Pont Cyrel® HIQ and the flexographic printing plate obtained by using the inventive curable jettable liquid INV-7 which did not contain an acid functional monomer.

It should be clear from the above examples that the different properties of a flexographic printing plate can be altered to a desired level by controlling the type and concentration of monomers, oligomers, photo-initiators and plasticizers.

Having described in detail preferred embodiments of the current invention, it will now be apparent to those skilled in the art that numerous modifications can be made therein without departing from the scope of the invention as defined in the following claims.

We claim:

1. A curable jettable liquid for manufacturing a flexographic printing plate comprising at least one photo-initiator, at least one monofunctional monomer, at least 5 wt % of a polyfunctional monomer or oligomer and at least 5 wt % of a plasticizer both based on the total weight of the curable jettable liquid, said curable jettable liquid being capable of realizing a layer after curing having an elongation at break of at least 5%, a storage modulus E' smaller than 200 MPa at 30 Hz and a volumetric shrinkage smaller than 10%, wherein said polyfunctional monomer or oligomer is an urethane diacrylate, and wherein said curable jettable liquid contains at least one monomer or oligomer with at least one acid functional group.

2. The curable jettable liquid according to claim 1, wherein said curable jettable liquid is a UV curable jettable liquid.

3. The curable jettable liquid according to claim 1, wherein said plasticizer has a molecular weight of less than 5000.

4. The curable jettable liquid according to claim 1, wherein said curable jettable liquid has a viscosity of not more than 15 mPa·s at a shear rate of 100 $s^{-1}$ and at a temperature between 15 and 70° C.

5. The curable jettable liquid according to claim 1, wherein said polyfunctional monomer or oligomer has a viscosity larger than 50 mPa·s at a shear rate of 100 $s^{-1}$ and at a temperature between 15 and 70° C.

6. The curable jettable liquid according to claim 1, wherein said at least one acid functional group is selected from the group consisting of a carboxylic acid functional group and a phosphoric acid functional group.

7. The curable jettable liquid according to claim 1, wherein said at least one acid functional group is selected from the group consisting of an acid functionalized acrylate monomer, an acid functionalized (metha)acrylate monomer, an acid functionalized acrylate oligomer and an acid functionalized (metha)acrylate oligomer.

8. The curable jettable liquid according to claim 1, wherein said at least one acid functional group is selected from the group consisting of 2-(methacryloyl)ethyl phthalate, 2-(acryloyl)ethyl phthalate, 2-(methacrylyoloxy)ethyl succinate, 2-(acryloxy)ethyl succinate, ethylene glycol methacrylate phosphate and 2-carboxyethyl acrylate.

9. The curable jettable liquid according to claim 1, wherein the curable jettable liquid has a viscosity of less than 50 mPa·s at a shear rate of 100 $s^{-1}$ and at a temperature between 15 and 70° C.

10. The curable jettable liquid according to claim 2 further comprising a biocide.

11. The curable jettable liquid according to claim 1 further comprising a biocide.

12. The curable jettable liquid according to claim 1, wherein said polyfunctional monomer or oligomer has a viscosity larger than 50 mPa·s at a shear rate of 100 $s^{-1}$ and at a temperature between 15 and 70° C., and wherein said curable jettable liquid has a viscosity of less than 50 mPa·s at a shear rate of 100 $s^{-1}$ and at a temperature between 15 and 70° C.

13. The curable jettable liquid according to claim 12, wherein said curable jettable liquid has a viscosity of not more than 15 mPa·s at a shear rate of 100 $s^{-1}$ and at a temperature between 15 and 70° C.

14. The curable jettable liquid according to claim 12, wherein said at least one acid functional group is selected from the group consisting of an acid functionalized acrylate monomer, an acid functionalized (metha)acrylate monomer, an acid functionalized acrylate oligomer and an acid functionalized (metha)acrylate oligomer.

15. The curable jettable liquid according to claim 14, wherein said at least one acid functional group is selected from the group consisting of 2-(methacryloyl)ethyl phthalate, 2-(acryloyl)ethyl phthalate, 2-(methacrylyoloxy)ethyl succinate, 2-(acryloxy)ethyl succinate, ethylene glycol methacrylate phosphate and 2-carboxyethyl acrylate.

16. The curable jettable liquid according to claim 12, wherein said curable jettable liquid is a UV curable jettable liquid.

17. The curable jettable liquid according to claim 13, wherein said curable jettable liquid is a UV curable jettable liquid.

18. The curable jettable liquid according to claim 14, wherein said curable jettable liquid is a UV curable jettable liquid.

19. The curable jettable liquid according to claim 15, wherein said plasticizer has a molecular weight of less than 5000.

20. The curable jettable liquid according to claim 15 further comprising a biocide.

* * * * *